Figure 3:
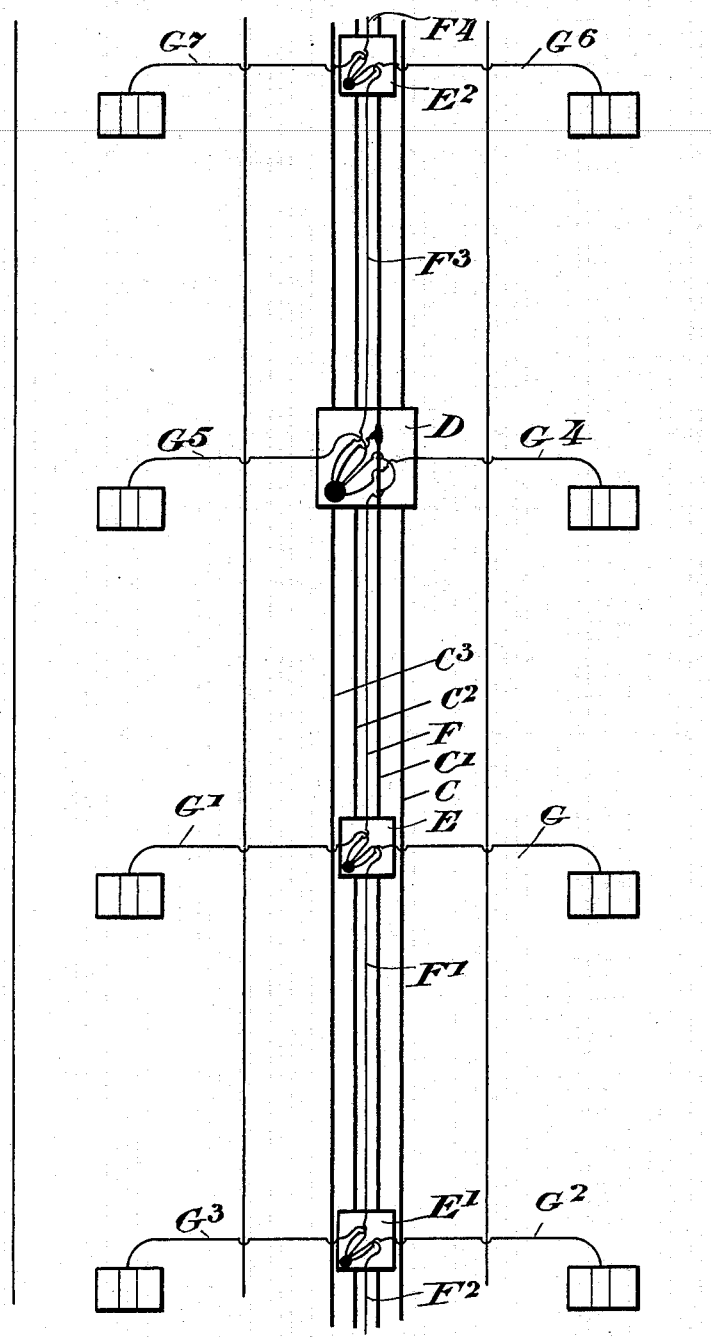

No. 612,146. Patented Oct. 11, 1898.
J. N. THOMAS.
ELECTRIC SYSTEM OF DISTRIBUTION.
(Application filed Feb. 15, 1898.)
(No Model.) 3 Sheets—Sheet 1.
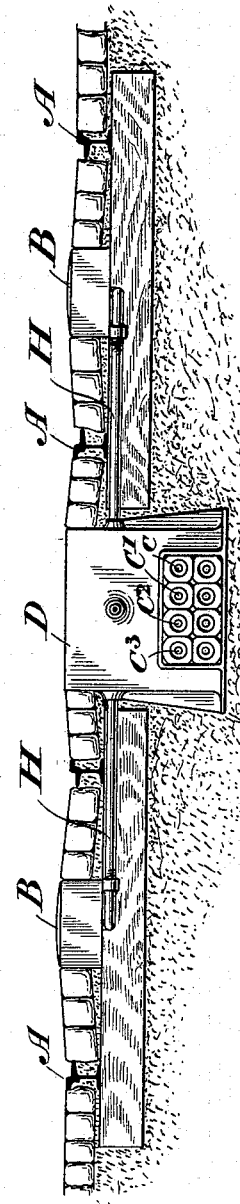
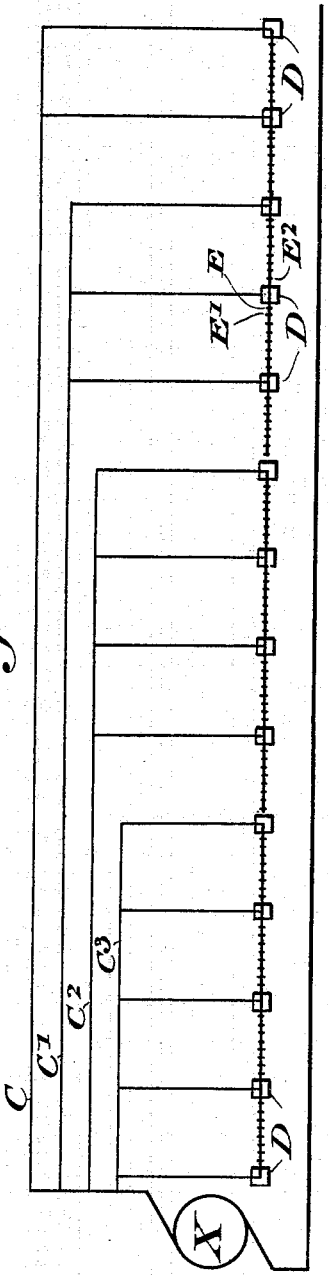
WITNESSES: INVENTOR
Jos. N. Thomas
BY
ATTORNEY.

No. 612,146. Patented Oct. 11, 1898.
J. N. THOMAS.
ELECTRIC SYSTEM OF DISTRIBUTION.
(Application filed Feb. 15, 1898.)
(No Model.) 3 Sheets—Sheet 3.

UNITED STATES PATENT OFFICE.

JOSEPH N. THOMAS, OF JOHNSTOWN, PENNSYLVANIA, ASSIGNOR TO THE JOHNSON COMPANY, OF LORAIN, OHIO.

ELECTRIC SYSTEM OF DISTRIBUTION.

SPECIFICATION forming part of Letters Patent No. 612,146, dated October 11, 1898.

Application filed February 15, 1898. Serial No. 670,430. (No model.)

*To all whom it may concern:*

Be it known that I, JOSEPH N. THOMAS, of Johnstown, in the county of Cambria and State of Pennsylvania, have invented a new and useful Electric System of Distribution, of which the following is a full, clear, and exact description, reference being had to the accompanying drawings, which form a part of this specification.
My invention relates to electric systems of distribution, and is more especially designed for use with electric railways, but some of the features of my invention are equally adapted for use with systems of distributing current for electric lighting, heating, &c.

One object of my invention is to provide a distribution system for those electric railways which employ disconnected or isolated contacts as terminals for one side of the main circuit which will be so arranged that a defect in any part of the system may be readily located and removed.

Another part of my invention relates to the connecting of the ends of conductor-sections in an improved manner, whereby I am enabled to provide a cheap and simple, yet thoroughly efficient and durable, connection and one which may be quickly disconnected in case it is desired to test or repair any parts of the system.

Another object of my invention is to provide a simple form of junction-box for distribution systems, which will be composed of few parts and in which there are no rigid connections required in order to prevent the entrance of surface water from the street.

In the detailed description which will appear hereinafter the means by which I obtain these general objects will be fully set forth, as well as the various detailed advantages which these means effect.

Figure 5:
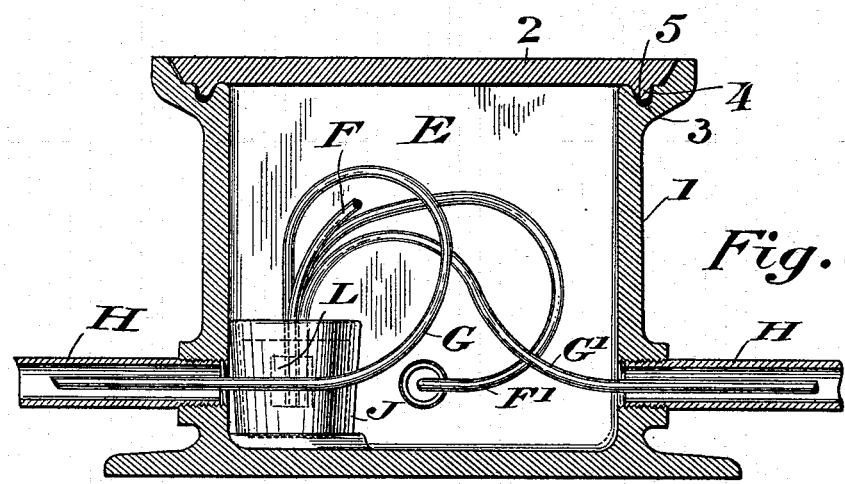
Figure 4:
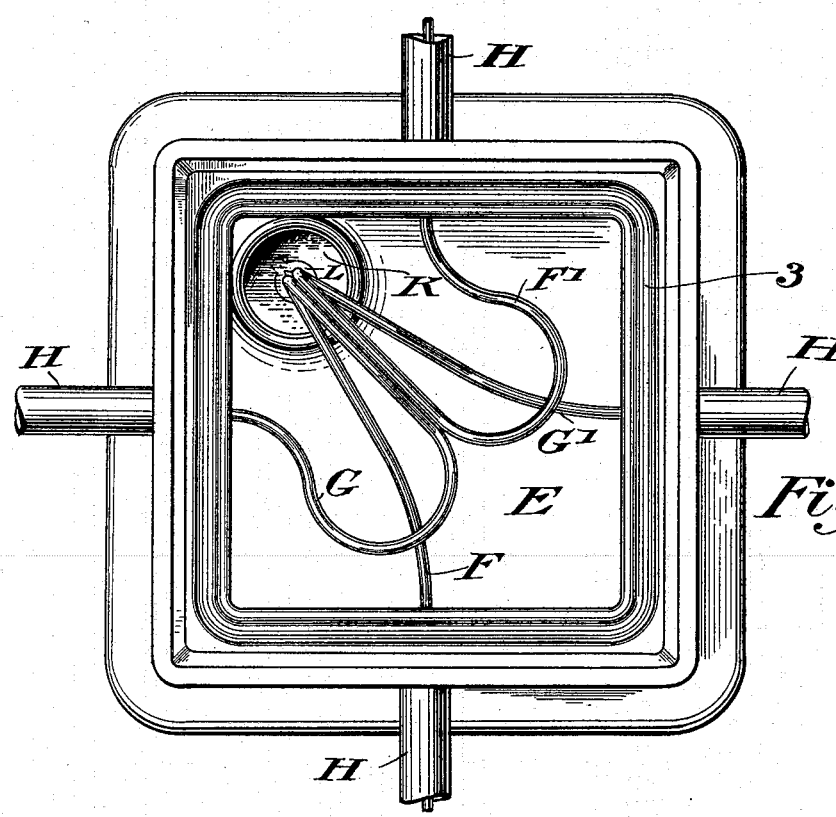

Referring to the drawings, Figure 1 shows a cross-section of a double-track electric railway embodying the general features of my distribution system. Fig. 2 is a general diagrammatical view of such a system, the contact-sections and connections thereto being omitted. Fig. 3 is a diagram of a portion of the railway system. Fig. 4 is a section through one of the subsidiary junction-boxes of the system, and Fig. 5 is a plan view of the same with the cover of the box removed.

A represents the track-rails, which I prefer to use as the negative or return side of the main electric circuit.

B represents the disconnected or isolated contact-sections which form terminals for the positive or high-potential side of the main circuit.

The general system of connecting the contact-sections B with the high-potential side of the circuit is shown in the diagrammatic views, Figs. 2 and 3.

C, C', C², and C³ represent lead-covered feeders connected with one terminal of the generator X in any suitable manner. Whether they are connected directly together at the power-house end or whether they are connected independently through separate safety devices, as is the usual practice, is entirely immaterial to the present invention.

D represents one of what I shall call the "main" junction-boxes. These main junction-boxes are located upon the line of way at suitable distances apart and serve to connect one of the main feeders, as C', with the subfeeder for a particular division of the system. The main junction-boxes serve to still further divide the system into subdivisions, as shown in Fig. 2, most of the subdivisions being connected at each end to a main junction-box, while those at the end of each feeder are connected at only one end to a main junction-box.

Opposite the contact B, or, in case of a double-track road, as shown, between each pair of contacts B, is located what I shall call a "subsidiary" junction-box, as E, E', or E². These subsidiary junction-boxes serve to connect together the short sections of the subfeeders, as F to F' or F' to F², and also serves to connect the subfeeders to the contact-feeders, as G and G' or G² and G³.

The main junction-boxes D, beside serving the purposes set forth, also serve the purposes which are attained by the subsidiary junction-boxes E E', &c.—that is to say, within the main junction-boxes D subfeeders are not only connected with the main feeders, but they are also connected to each other, as F to F³, and to the contact-feeders, as G⁴ and G⁵.

Turning now more particularly to Fig. 1, it will be seen that the main feeders C C', &c., are carried centrally between the two tracks of the railway, being thoroughly insulated and protected by suitable means, which need not here be described. These feeders will of course vary in number according to the size of the system. For very small roads only one may be required. I have shown eight in Fig. 1 and only four in Fig. 2, but whether there are more than eight or less than four is entirely immaterial to the purpose of the present invention. The main junction-boxes D are preferably made somewhat deeper than the subsidiary junction-boxes E to allow a passage in the lower part of the box for the main feeders.

As shown in Fig. 1, the contact-feeders are protected by suitable pipes H, and such an arrangement is preferred not only for the contact-feeders G G', &c., but also for the subsidiary feeder-sections F F', &c.

Turning now more particularly to Figs. 4 and 5, which show views of one of the subsidiary junction-boxes, it will be seen that the boxes are formed of two parts—a base 1 and a gravity-lid 2. 3 is a continuous recess formed around the top of the base. 4 is a continuous downward projection from the lid or cover 2 and projects into the said recess 3. 5 represents an insulating fluid placed in the recess 3 and forming a seal to prevent the flow of water into the box. This fluid should be composed of such ingredients that it will not stiffen at ordinary winter temperature and should have a specific gravity greater than that of water, so as to prevent water from expelling the liquid seal and working its way into the box. It should also be composed of such ingredients that it will not tend to mix with water, and thus lose its efficiency as a seal.

The pipes H, which surround the feeders and contact-feeders, terminate, as clearly shown in Fig. 4, in suitable openings in the sides of the base 1. The various feeders are connected together in the following manner:

Within the base is an open vessel J, which may be of glass, porcelain, or other suitable material. In this vessel is a liquid insulator K of the same character as that hereinbefore described. The ends of the feeders and contact-feeders F and F' and G and G' are bared and then connected together by any suitable form of electrical connector, such as the small clamp L, which I have shown. This connector is then submerged in the liquid K. I prefer to use this form of connection throughout the system, the only difference in the main junction-boxes being that five feeder ends must be connected together instead of four. If desired, however, there may be two vessels in the main junction-boxes, one to connect the main feeder to the subfeeder and the other to make a connection similar to that shown in the subsidiary junction-boxes. This is of course entirely immaterial to the main purpose of my invention.

With the foregoing description of the construction of the various parts of my system the advantages thereof may be readily seen. No matter how carefully the cables may have been connected, insulated, and protected, it is impossible to so instal a system that all danger of defective parts is eliminated. By the means which I employ a defect can be located and repaired in the shortest possible period of time.

I do not consider it necessary in this specification to describe in detail the manner in which such a system as mine may be tested for leaks or other defects, as the method need not differ materially from that used on other systems now in vogue. My improved system, however, minimizes the time required to the utmost, for it is not necessary to cut or resplice any cables to make the test or to remove the bolts from any junction-box covers or to remove or repair long lengths of cables or any cables except those in which a defect may be found.

To repair it is only necessary to disconnect each end of the particular section and replace it by a new piece of cable. It will be noted that the cables are all substantially straight lines, and that under no circumstances would it be necessary to remove anything but a very short piece of the sub or contact feeder.

The cheapness, simplicity, and effectiveness of my novel arrangement of connecting together the feeders, as shown in Figs. 3 and 4, must be obvious. The junction-boxes may be flooded with water without any danger of a circuit becoming established between the connected ends of the feeders and the walls of the box, yet the arrangements are such that the connection between the feeders may be instantly examined and no substantial time need be lost when it is necessary to open the box and examine the connection or even when it is necessary to make a new connection.

Throughout the drawings the contacts B have been shown, for the sake of simplicity, as being directly connected with the contact-feeders. In railways of this class, however, there is usually a switching mechanism interposed between the two, but my present invention is equally applicable to either arrangement.

I desire to be understood as not limiting myself to the specific construction and arrangement which I have shown in detail to illustrate the nature of my invention and the manner in which it may be put into use, for many modifications might be made therein without departing outside the full scope thereof.

Having thus described my invention, what

I claim, and desire to protect by Letters Patent, is—

1. The combination of the disconnected contacts, a junction-box opposite each disconnected contact, a subfeeder normally continuous throughout its length, but composed of a plurality of sections connected together within each junction-box, and a contact-feeder connected in each junction-box to the subfeeder and terminating at its other end at the corresponding disconnected contact.

2. In an electric-railway system the combination of the main feeders and the sectional subfeeders, the main junction-boxes and the subsidiary junction-boxes, the disconnected contact-sections, the contact-feeders feeding the said contact-sections, connections within the subsidiary junction-boxes between the contact-feeders and the subfeeders and between sections of the latter, and connections within the main junction-box between the main and sub feeders.

3. The combination with the disconnected contact-sections of an electric railway of the subsidiary junction-boxes, one beside each disconnected contact, feeders passing through said subsidiary junction-boxes, and a short contact-feeder connected thereto and leading from within the said box to the disconnected contact beside the same.

4. An electric-railway system comprising the combination with the main source of supply and the return circuit connected therewith, of a plurality of main feeders also connected therewith and dividing the system into a corresponding plurality of divisions, main junction-boxes dividing each division into a plurality of subdivisions, connections within each main junction-box between the main feeder and the subfeeder for the particular division, subsidiary junction-boxes between the main junction-boxes and a disconnected contact-section beside each of the same, and a connection within each subsidiary junction-box between sections of the subfeeder and between the same and a contact-feeder leading to a disconnected contact.

5. In an electric-railway system, the combination of the disconnected contacts and the subsidiary junction-boxes for connecting the same to the subfeeders, the main junction-boxes connecting a subfeeder to a main feeder and dividing the system into subdivisions, or groups of disconnected contacts, and the main feeders connected to different subfeeders and dividing the system into a plurality of divisions, each division containing a plurality of the aforesaid subdivisions.

6. The combination of main feeders, subfeeders normally continuous throughout their length but composed of a plurality of sections connected together, said subfeeders being connected directly to the main feeders, contact-feeders connected to the subfeeder, and a disconnected contact connected to each contact-feeder.

7. In an electric-railway system, the combination of the main feeders C, C' &c. dividing the system into divisions, the main junction-boxes D dividing each division into subdivisions, a separate subfeeder composed of sections F, F' &c. for each of said divisions, the contacts B and contact-feeders G, G', &c. terminating at the same, and the subsidiary junction-boxes E, E' &c. uniting the sections of said subsidiary feeder and connecting the same to the said contact-feeders.

8. The combination of a main feeder, a main junction-box, subsidiary junction-boxes, disconnected contacts beside each junction-box, a sectional subfeeder, contact-feeders, a connector within the main junction-box uniting the main feeder, adjacent sections of the contact-feeder and the subfeeder leading to the particular disconnected contacts beside the main junction-box, and a connector within each subsidiary junction-box uniting adjacent sections of the subfeeder and the contact-feeders leading to the particular disconnected contacts beside the subsidiary junction-box.

9. The combination of disconnected contacts, subsidiary junction-boxes, a contact-feeder from each subsidiary junction-box to a disconnected contact, a subfeeder passing through a plurality of said subsidiary junction-boxes and connected therein to each contact-feeder leading from the same, a main junction-box for each plurality of subsidiary junction-boxes, and a main feeder connected within said junction-box to the said subfeeder.

10. The combination of a plurality of groups of main junction-boxes, a corresponding plurality of main feeders, subfeeders extending between the main junction-boxes of each group, connections within the main junction-box of each group between one main feeder and the sectional subfeeders, a plurality of subsidiary junction-boxes between each main junction-box, contact-feeders and disconnected contacts connected to the same, and connections within each subsidiary junction-box between sections of the subfeeder and between the latter and a contact-feeder.

11. The combination of a vessel, a liquid insulating medium therein of a specific gravity greater than that of water, conductors leading into the said medium, and a connecting device also within the said medium, uniting the ends of the said conductors.

12. The combination with an electric connecting or bonding device of a body of liquid insulating medium of a specific gravity greater than that of water enveloping the same.

13. The combination of a vessel containing a liquid insulating medium of a specific gravity greater than that of water, a plurality of electric conductors, and an electric connector uniting the same and immersed in the said medium.

14. A junction-box and a plurality of underground electric conductors entering the same, in combination with a vessel within said box containing a liquid insulating medium of a specific gravity greater than that of water, and an electric connector submerged in said medium and uniting the ends of said conductors.

In testimony whereof I have affixed my signature in presence of two witnesses.

JOSEPH N. THOMAS.

Witnesses:
 MYRTLE E. SHARPE,
 H. W. SMITH.